G. W. STEDWELL
LIQUID DISPENSING
March 22, 1932.
Original Filed Dec. 3, 1928
Re. 18,396
3 Sheets-Sheet 1
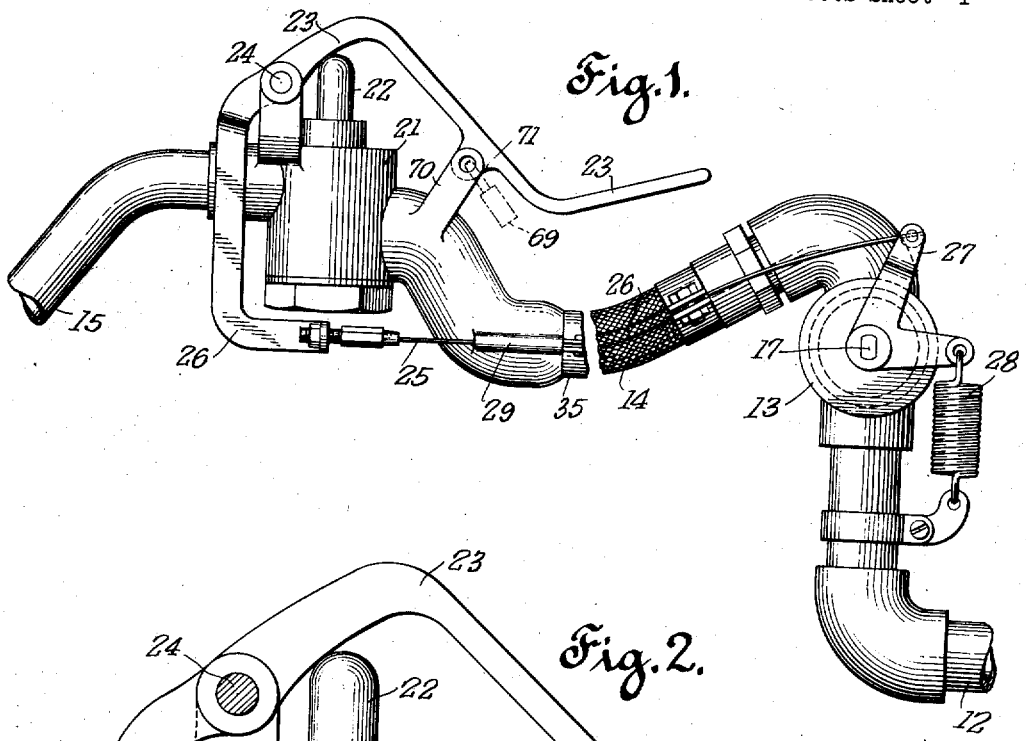
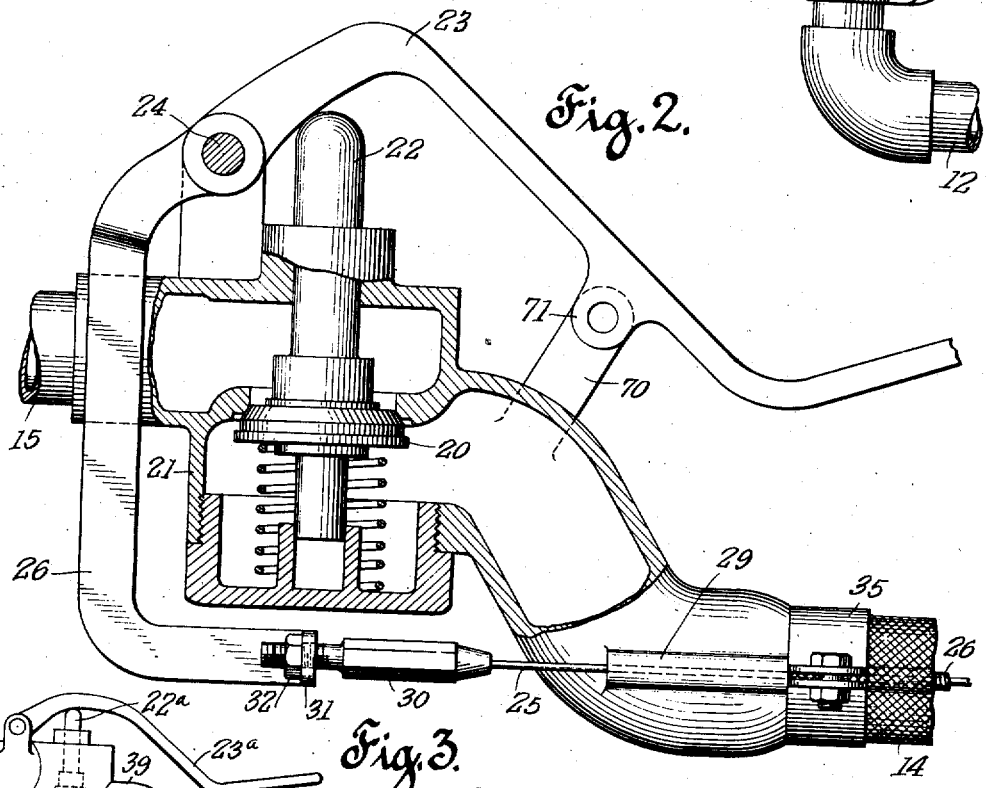
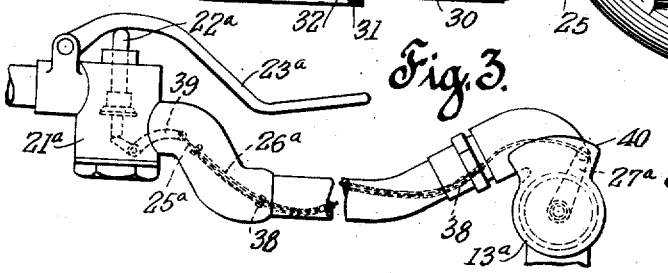
INVENTOR
George W. Stedwell
BY
Philip S. McGean
ATTORNEY

G. W. STEDWELL

March 22, 1932.

LIQUID DISPENSING

Original Filed Dec. 3, 1928

Re. 18,396

3 Sheets-Sheet 2

INVENTOR

George W. Stedwell

BY

Philip S. McLean.

ATTORNEY

G. W. STEDWELL

March 22, 1932.

LIQUID DISPENSING

Original Filed Dec. 3, 1928

Re. 18,396

3 Sheets-Sheet 3

INVENTOR

George W. Stedwell

BY

Philip S. McGean

ATTORNEY

Reissued Mar. 22, 1932 Re. 18,396

UNITED STATES PATENT OFFICE

GEORGE W. STEDWELL, OF BROOKLYN, NEW YORK, ASSIGNOR, BY DIRECT AND MESNE ASSIGNMENTS, TO SHERWELL CONTROLS, INC., OF NEW YORK, N. Y., A CORPORATION OF NEW YORK

LIQUID DISPENSING

Original No. 1,713,102, dated May 14, 1929, Serial No. 323,411, filed December 3, 1928. Application for reissue filed May 13, 1931. Serial No. 537,161.

This invention relates particularly, though not exclusively, to the delivery of gasoline and the like.

Special objects of the invention are to provide apparatus for the purpose, which will be simple, safe, positive and operable to accurately and speedily deliver various required amounts of the liquid.

Further objects of the invention are to enable the delivery being entirely controlled at the discharge end of the apparatus.

The foregoing and other desirable objects are attained by the novel features of construction, combination and relation of parts, hereinafter described and illustrated by way of example in the accompanying drawings.

Figure 4:
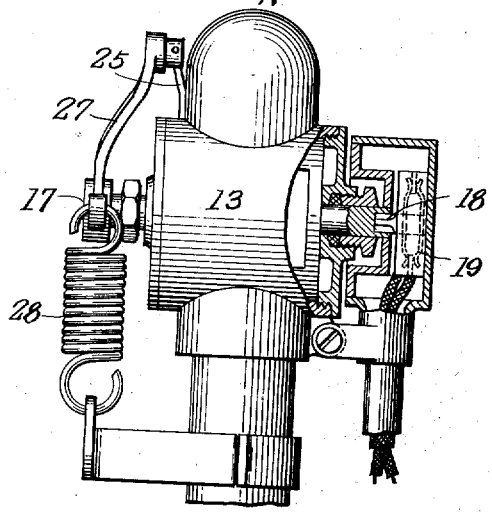
Figure 5:
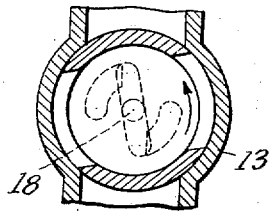
Figure 9:
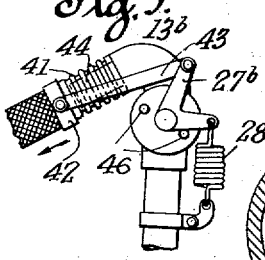
Figure 7:
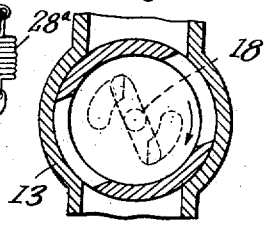
Figure 6:
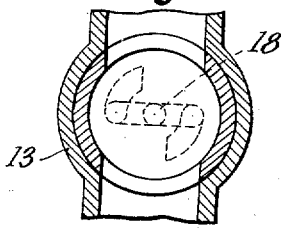
Figure 10:
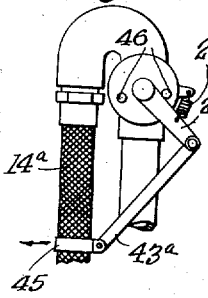
Figure 8:
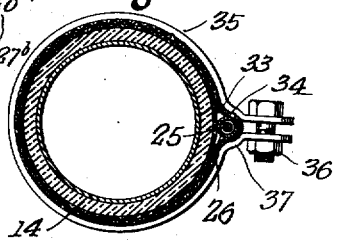
Figure 11:
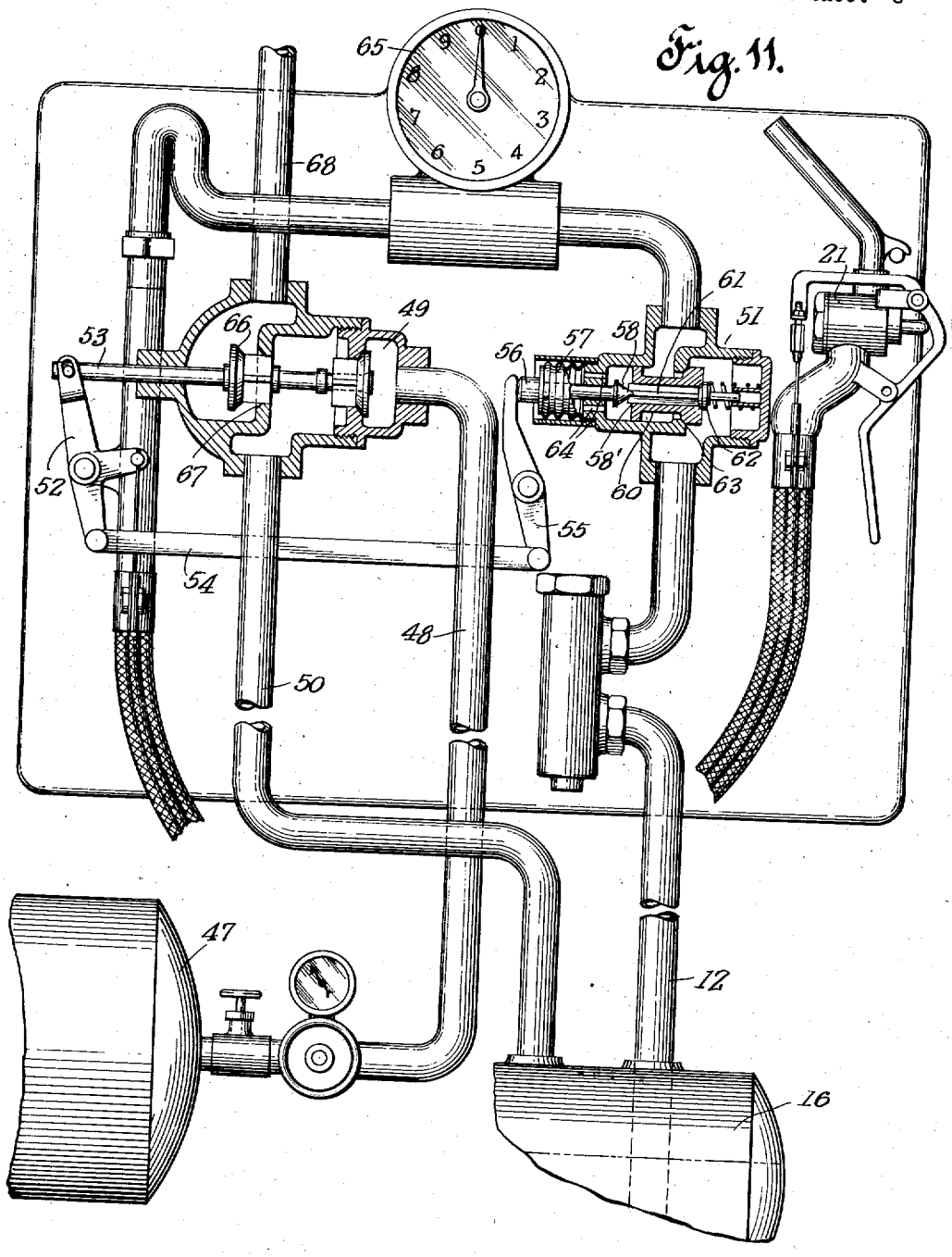

In the drawings, Fig. 1 is a broken side view of the discharge hose end of a gasoline delivery system having features of the invention incorporated therein; Fig. 2 is an enlarged and broken sectional view illustrating details of the nozzle valve and Bowden wire control; Fig. 3 is a smaller view similar to Fig. 1 illustrating a construction in which the Bowden wire control is contained entirely within the hose; Fig. 4 is a view of the combination delivery valve and electric switch, the former governing flow to the hose and the latter controlling an electric pump or valve governing flow in the delivery line; Figs. 5, 6 and 7 are broken sectional views illustrating the timed relation of the valve and switch; Fig. 8 is an enlarged cross-sectional view of the hose showing the weaving of the Bowden wire into the body structure of the hose; Figs. 9 and 10 are broken detail views illustrating modifications in which operation of the controls is effected by simply pulling on the hose; Fig. 11 is a broken part sectional view showing the invention applied to an air pressure system of delivery.

In Fig. 1 a delivery or supply line is indicated at 12 having a delivery valve 13 therein and terminating in a flexible discharge hose 14 ending in a suitable discharge nozzle 15.

The liquid to be delivered is furnished the delivery line from a suitable supply, such as a storage tank and an electrically driven pump as in Fig. 4 of Patent 1,685,036 or from a pressure tank as in Fig. 5 of the same patent, or as in Fig. 11 of this case from a tank 16 from which the liquid is expelled by compressed air.

The delivery valve 13 is shown in Fig. 1 as of the rotary plug type, but it should be understood that other forms of valves may be employed, the one illustrated being convenient and suitable for the purpose, providing as it does a shaft 17 by which it may be operated and which may be coupled as indicated at 18 in Fig. 4 to operate an electric controlling switch 19.

The final delivery is shown as controlled by a valve 20 operating in a valve casing 21 in the nozzle and having a projecting stem 22 engaged by a valve opening hand lever 23 pivoted on the nozzle at 24.

The movement of the nozzle valve hand lever 23 is utilized to effect the operation of the delivery valve and control switch through the medium of a Bowden wire flexible mechanical connection 25 engaged with an extension 26 of the hand lever and extending along the hose through a tubular guard or cover 26 to one arm of the bell crank lever 27 on the end of delivery valve shaft 17. The other arm of this bell crank lever is shown engaged by a valve closing spring 28 which is heavy enough to close the delivery valve and also to pull the Bowden wire back through its flexible sheath when the grip on the hand lever is released.

A rigid guide 29 is shown formed on the side of the nozzle structure for the lower end of the Bowden wire, directing the same in a substantially straight line to the lever 26, which is shown doubled in under the valve casing, to shorten the exposed length of wire. For adjustment purposes, the end of the wire is shown as having a turn-buckle connection in the form of a rotatable member 30 having a screw engagement in the angled end 31 of the lever 26 and secured in its position of adjustment by lock nut 32.

Another special feature of the Bowden wire connection thus far described is that the sheath of the same is built into the structure of the hose, so as to be in effect an integral part of the same. This is shown as accomplished in Fig. 8 by encasing the sheath in between the inner and outer layers 33, 34 of the braided or woven outer covers of the hose. In practise, the hose may be made up with the inside cover and the outside cover be then applied so as to encompass and incorporate the Bowden wire within the hose structure. Encircling clamps 35 are shown applied about the end portions of the hose, said clamps being set up tight by screws 36 and fitted at 37 to grip the bulge of the Bowden wire, so as to hold the latter against tendencies to twist or spiral in the hose. The Bowden wire is thus by its incorporation in the hose and by means of the end guide and clamps held in substantially parallel relation with the axis of the hose so that the length of the wire will not be varied to any objectionable extent by the bending or twisting of the hose.

Another way of incorporating the Bowden wire into the hose is illustrated in Fig. 3. In this case, the Bowden wire designated 25*a* is placed inside the hose, being shown as spiraled so as to lay against the inside wall of the hose and to accommodate itself to the bending of the hose without objectionably varying in length, the sheath 26*a* of the wire being suitably held in the end fittings of the hose as indicated by the clips 38. In this case, inside connections can be made at both ends of the Bowden wire. Thus, at the nozzle end the wire is shown connected with one arm of a bell crank lever 39 mounted in the nozzle valve casing 21*a* in position with its other arm beneath the lower end of the valve stem 22*a* so that each time the hand lever 23*a* is operated, the opening of the valve will effect a pull on the Bowden wire. At the opposite end the wire is connected with the valve lever 27*a* within the casing 13*a* of this valve, which for the purpose is made to enclose the valve operating lever as indicated at 40.

The fully enclosed type of Bowden wire control shown in Fig. 3 has certain advantages, particularly as regards the enclosure and mechanical protection of the Bowden wire and its connections. The Bowden wire constituting the motion transmitting mechanism connecting the remotely related nozzle valve and switch or switch and valve may be considered in effect a plunger like means.

Instead of incorporating a Bowden wire in the hose, the hose itself may be utilized as a form of flexible mechanical connection for operating the delivery valve mechanism. Thus as shown in Fig. 9, an extensible or telescopic section such as the sylphon or corrugated metallic bellows 41 may be interposed as a section of the hose length permitting expansion or extension of the hose and a part of the hose beyond or below such extensible portion, such as the collar 42 may be connected with the valve lever 27*b* by means of a link 43. This bellows section is shown telescopically secured over an extension sleeve 44 of the valve head 13*b* and the valve closing spring 28*a* is made strong enough in this instance to effect both closing of the valve and the collapsing movement of the hose section when pull on the hose is released.

In another embodiment of this "hose pull" delivery valve, shown in Fig. 10, the link 43*a* connected with the valve lever, is engaged with a collar or loop 45, or otherwise hooked about the down-hanging upper end portion 14*a* of the hose, so that an outer pull on the hose in the direction of the arrow will open the valve. In this case, also the valve closing spring 28*a* effects a retractive movement of the hose enabling the operator to control the delivery valve entirely by pulling or releasing pull on the hose. This last construction, it may be observed, may be applied to existing filling stands.

Stops indicated at 46 may be provided to limit the valve opening and closing movements and also the extensive and retractive movements of the hose.

The delivery valve and the switch which controls the supply of liquid into the delivery line may have a timed relation such that the liquid will be started into the line before the valve opens, so as to be ready for instant delivery the moment the valve permits and such that the valve will close before the switch is thrown "off", to make sure that the delivery of liquid will be fully completed. This time relation of valve and switch is illustrated in Figs. 5, 6 and 7, and as there shown is accomplished by making the coupling 18 between valve stem and switch as a lost motion connection by which the switch is thrown "on" before the valve opens and thrown "off" after the valve closes—see particularly Figs. 5 and 7.

The Bowden wire or "pull hose" mechanical controls may be applied to air pressure or other forms of delivery systems. For example, an air pressure delivery system is illustrated in Fig. 11 in which the Bowden wire is utilized, the compressed air being there shown as supplied from a tank 47 through pipe 48 and by way of valve 49 and a pressure line 50 to the top of the pressure tank 16, which receives liquid from a storage tank by gravity and check valve or otherwise, the liquid flowing from this tank by delivery line 12, governed by the Bowden wire control, which in this case operates both the air valve 49 and the special delivery valve 51. For operating both these valves, the Bowden wire is shown connected with a triple armed bell crank 52 having one arm engaged with the stem 53 of the air valve and the extra or third arm connected by pull link 54 with the lever 55 bearing on the stem 56 of the delivery valve.

This delivery valve is shown as of a special push type in which the stem 56 is sealed tight in a leak-preventing sylphon 57. The inner end of this stem is shown as carrying a valve 58, which can close against a seat 58′ in the end of the hollow sliding valve body 60 after it has pushed in the valve stem 61 sliding in the bore of the tubular valve body. Valve stem 61 carries a spring pressed valve 62 seating in the opposite end of the sliding valve body 60, so that in this first part of the movement valve 58 opens valve 62 admitting liquid under pressure in the delivery line to the back end of the sliding valve body 60, balancing the latter so as to reduce the force required to shift this main valve from its seat 63. This lost motion arrangement thus effects first the valving of pressure behind the main delivery valve and then the opening of said main delivery valve.

Passages 64 are shown about the stem of the starting valve 58 admitting liquid from the back of the main valve into the sylphon, these same passages permitting discharge of liquid from within the sylphon as the same is compressed or contracted. This liquid then serves in effect as a hydraulic piston, as valve 58 seats in the end of the main valve 60 aiding in transmission of the opening movement to said main valve 60. As the main valve opens, the liquid in the delivery line flows on through the meter 65 and out the hose under control at all times of the nozzle valve 21.

The air valve at 49 is shown as of the pressure-relief type involving an extra reversely faced valve element 66 on the valve stem 53 closing against seat 67 to shut off the vent line 68. Delivery is effected by opening valve 49 and when delivery is completed, valve 49 is closed and valve 66 is opened thus permitting air pressure in tank 16 to vent back through line 50, 68.

The Bowden wire control in the case last described thus effects a tandem operation of pressure supply valve mechanism and delivery valve mechanism, and it will be plain from the disclosure that the same may be applied to other types or forms of dispensing apparatus.

As the Bowden wire is incorporated within and anchored in the flexible hose, it is in effect a unitary portion of the hose, adding no appreciable bulk or projections on the hose, flexing freely with the hose and operating in all the different positions of the hose. The incorporation of this Bowden wire in the hose also provides mechanical protection for the Bowden wire assuring proper operation of the same even under conditions of abuse.

In order that the entire control mechanism may be locked when not in use, a padlock is indicated at 69 in Fig. 1, having its hasp passed through aligning openings in a stationary lug 70 on top of the nozzle and a locking lug 71 on the underside of the hand grip. This arrangement locks the hand grip and through that the nozzle valve, the flexible operating connections and the control mechanism at the head or entry end of the hose. The location of the hand grip on top of the nozzle and the extension of the part 26 below or to the underside of the nozzle forms a compact, convenient and easily operating structure.

What is claimed is:

1. Dispensing apparatus of the character disclosed, comprising a flexible hose, a flexible Bowden wire housed and contained within the structure of said hose and thereby held to flex with the hose and be concealed and protected by the hose structure and means for holding the enclosed Bowden wire against displacement in the hose structure.

2. In dispensing apparatus, a hose constructed of multiple layers of material, a Bowden wire encased between layers of said hose material and fixed guide means for the end portion of the Bowden wire.

3. A liquid dispensing hose made up of multiple layers of material, a flexible tubular sheath encased between layers of said material and a flexible pull wire extending through said encased sheath.

4. A liquid dispensing hose made up of multiple layers of material, a flexible tubular sheath encased between layers of said material, a flexible pull wire extending through said encased sheath, said wire projecting from the encased sheath and a fixed guide in line with the encased sheath and about said projecting portion of the wire.

5. Liquid dispensing apparatus, comprising in combination a delivery hose, a nozzle valve controlling discharge therefrom, a hand lever for operating said nozzle valve, a Bowden wire connected to be operated by said hand lever and extending from said nozzle valve back along the hose and an electric switch for controlling apparatus of said liquid delivery system having an operative connection with the rearward end of said Bowden wire, so as to be actuated thereby in conjunction with the operation of the nozzle valve.

6. In combination with a liquid delivery hose having a nozzle valve, control means at the entry end of said hose, operating means for the nozzle valve, a Bowden wire flexible drive connection from said nozzle valve actuating means extending back along the hose to said control means and means for varying the effective length of the Bowden wire connection to time the nozzle valve and the control means in the desired operating relation.

7. In combination with a flexible delivery hose, a flexible mechanical operating connection incorporated in the structure and housed within the body of said hose, so as to be concealed and protected thereby, fixed guiding means within the hose structure for the opposite ends of said flexible mechanical operating connection to thereby confine opposite end portions of the flexible mechanical connection to longitudinal movement in definite paths and control means at the inlet and delivery ends of said hose and connected with opposite end portions of said concealed flexible operating connections.

8. Dispensing hose having a nozzle valve, a hand grip mounted on top of said hose for operating said nozzle valve and having an extension projecting to the underside of the hose, control means at the entry end of the hose and a flexible mechanical connection positively guided in line with and connected to said extension at the underside of the hose, said connection extending back along the hose from said hand grip.

9. A flexible dispensing hose, a co-extensive flexible Bowden wire control carried thereby and adjustable clamps about the flexible portions of said hose, gripping the same and holding the Bowden wire control against turning relative to the body of the hose.

10. In liquid dispensing systems, a delivery line, a hose connected therewith, a delivery controlling valve in said delivery line, an electric control switch and operating means for closing the switch and opening the delivery valve after the switch is closed and for opening the switch after the delivery valve is closed.

11. In liquid dispensing systems, a delivery line, an electric switch for controlling a part of the delivery apparatus, a valve in the delivery line, a hose connected with said valve, flexible mechanical connections carried by said hose for effecting opening and closing movements of said valve and delayed action connecting means between said valve and switch for opening the valve after the switch is closed and for opening the switch after the valve is closed.

12. Liquid dispensing apparatus, comprising in combination a delivery hose, a nozzle valve controlling discharge therefrom, a hand lever for operating said nozzle valve, a Bowden wire connected to be operated by said hand lever and extending from said nozzle valve back along the hose, an electric switch for controlling apparatus of said liquid delivery system having an operative connection with the rearward end of said Bowden wire, so as to be actuated thereby in conjunction with the operation of the nozzle valve, a liquid delivery line connected with the flexible hose and a valve in said delivery line also connected to be operated by the rearward end of said Bowden wire, whereby the single handle at the nozzle will be effective to control the nozzle valve, the electric controlling switch and the additional valve in the delivery line.

13. Liquid dispensing apparatus, comprising in combination with a flexible delivery hose, a nozzle valve controlling discharge from said hose, a handle for operating said nozzle valve, a flexible power transmission wire slidably confined to, coextensive with and carried by said hose, said power transmission wire being connected to be operated by said handle, means for guiding said flexible power transmission wire for free sliding movement in the variously flexed conditions of the hose, uninterrupted flow liquid delivery means in connection with said hose and including electrical apparatus governing uninterrupted delivery of the liquid in varying amounts, an electric switch for controlling said apparatus and means for operatively connecting the rearward end of said flexible power transmission wire with said switch, whereby the latter will be actuated in conjunction with the operation of the nozzle valve.

14. Liquid dispensing apparatus, comprising in combination with a flexible delivery hose, a nozzle valve controlling discharge from said hose, a handle for operating said nozzle valve, a flexible power transmission wire slidably confined to, coextensive with and carried by said hose, said power transmission wire being connected to be operated by said handle, means for guiding said flexible power transmission wire for free sliding movement in the variously flexed conditions of the hose, uninterrupted flow liquid delivery means in connection with said hose and including electrical apparatus governing uninterrupted delivery of the liquid in varying amounts, an electric switch for controlling said apparatus, means for operatively connecting the rearward end of said flexible power transmission wire with said switch whereby the latter will be actuated in conjunction with the operation of the nozzle valve, said flexible power transmission wire extending through the hose and thereby concealed by the hose, mechanically protected by the hose structure and caused to closely conform to the movements of the hose, the guide means for slidingly directing said power transmission wire being associated with the hose structure to cause said wire to follow the hose movements without interfering with the free sliding movements of the same.

15. Liquid dispensing apparatus, comprising in combination with means controllable to furnish uninterrupted delivery of liquid in varying amounts including a liquid delivery line terminating in a flexible hose and a liquid flow control device in the delivery line, a nozzle valve controlling discharge from the hose, handle means for operating said nozzle valve, a flexible power transmission wire operatively connected with said handle and extending through the hose to the control means aforesaid, said power transmission wire being slidingly guided in the hose to follow the flexing movements of the hose without binding or interference in the free sliding movements of the power transmission wire through the hose.

16. In combination with a continuous flow delivery line terminating in a flexible delivery hose having a nozzle valve, control means for governing flow of liquid in the hose, handle means for operating the nozzle valve, a flexible power transmission wire connection from said nozzle valve actuating means to said control means, means for slidingly confining said flexible power transmission wire to the hose, whereby the same will flex with the hose without binding or interfering with the free sliding movements of the same and means at one end of said flexible power transmission wire for varying the effective length of the same to effect a proper operative relation between the nozzle valve and the control means aforesaid.

17. In combination with a continuous flow delivery line terminating in a flexible delivery hose having a nozzle valve, control means for governing flow of liquid in the hose, handle means for operating the nozzle valve, a flexible power transmission wire connection from said nozzle valve actuating means to said control means, means for slidingly confining said flexible power transmission wire to the hose, whereby the same will flex with the hose without binding or interfering with the free sliding movements of the same, means at one end of said flexible power transmission wire for varying the effective length of the same to effect a proper operative relation between the nozzle valve and the control means aforesaid, the said varying means including a screw coupling member having a rotatable engagement on the end of the power transmission wire.

18. In combination with a liquid delivery hose having a discharge nozzle, a handle member mounted at the discharge end of the hose, a flexible power transmission wire connected with said handle member and coextensive with the hose, said flexible transmission wire being slidingly guided and confined to flex with the hose without binding or having its free sliding movement interfered with, liquid flow governing control means for operation by said transmission wire and a turn buckle construction at one end of said wire for enabling variable adjustment of the effective length of the transmission wire to properly relate the parts for operation in the variously flexed conditions of the hose and transmission wire.

19. In combination with a liquid delivery hose having a discharge nozzle, a handle member mounted at the discharge end of the hose, a flexible power transmission wire connected with said handle member and coextensive with the hose, said flexible power transmission wire being guided and slidingly confined to flex with the hose without binding or restriction, liquid flow governing means connected for operation by the opposite end of said slidingly guided power transmission wire and an adjustable screw connection at the handle member end of said flexible power transmission wire for enabling the effective length of said power transmission wire to be varied for enabling proper operation of the control device by the handle member in variously flexed conditions of the hose and transmission wire.

20. In apparatus of the character disclosed, the combination of a liquid dispensing hose, electrically operated means for governing flow of liquid to the hose, a switch for controlling said means, a valve controlling delivery of liquid by the hose and operating mechanism for said switch and valve, including means for introducing a timed relation to throw the switch before opening the delivery valve.

21. In liquid dispensing systems, a liquid dispensing hose having a nozzle valve, a flexible mechanical connection extending from said nozzle valve back along the hose, flow regulating means actuated by said flexible mechanical connection, a flow meter in service relation to the hose and means for sequentially operating said flexible mechanical connection and nozzle valve arranged to delay opening of the nozzle valve until proper meter operating pressure has been developed.

22. In a liquid dispensing system, a liquid delivery line terminating in a flexible hose, controllable means for supplying liquid through said line and hose, a valve controlling discharge through the hose, and operating means for starting the liquid supplying means and opening the valve after said means has been started, and for closing said valve and stopping said means after the valve has been closed.

23. In a liquid dispensing system, the combination of a liquid delivery line terminating in a flexible hose provided with a nozzle valve, means at a point removed from said nozzle valve for controlling supply of liquid through the hose and means for effecting conjoint predetermined sequential operation of said nozzle valve and controlling means and for compensating for variations in the hose to thereby maintain the desired predetermined sequential operation of said nozzle valve and controlling means.

24. In a liquid dispensing system, the combination of a liquid delivery line terminating in a flexible hose provided with a nozzle valve, means at a point removed from said nozzle valve for controlling supply of liquid through the hose, means for effecting conjoint predetermined sequential operation of said nozzle valve and controlling means and for compensating for variations in the hose to thereby maintain the desired predetermined sequential operation of said nozzle valve and controlling means and including flexible mechanical connecting means carried by the hose and variable to effect the desired sequential operation of nozzle valve and controlling means under different conditions of the hose.

25. In a liquid dispensing system, the combination of a liquid delivery line terminating in a flexible hose provided with a nozzle valve, means at a point removed from said nozzle valve for controlling supply of liquid through the hose, means for effecting conjoint predetermined sequential operation of said nozzle valve and controlling means and for compensating for variations in the hose to thereby maintain the desired predetermined sequential operation of said nozzle valve and controlling means and including flexible mechanical connecting means carried by the hose and means for varying the effective length of the same to maintain the desired predetermined sequential operation of nozzle valve and supplying means under different conditions of the flexible hose.

26. In a liquid dispensing system, the combination of a liquid delivery line terminating in a flexible hose provided with a nozzle valve, means at a point removed from said nozzle valve for controlling supply of liquid through the hose and means for effecting conjoint predetermined sequential operation of said nozzle valve and controlling means and for compensating for variations in the hose to thereby maintain the desired predetermined sequential operation of said nozzle valve and controlling means and including a handle for operating the nozzle valve and a flexible connection with said handle and carried by the hose.

27. In a liquid dispensing system, the combination of a liquid delivery line terminating in a flexible hose provided with a nozzle valve, means at a point removed from said nozzle valve for controlling supply of liquid through the hose and means for effecting conjoint predetermined sequential operation of said nozzle valve and controlling means and for automatically compensating for variations in the hose to thereby maintain the desired predetermined sequential operation of said nozzle valve and controlling means.

In testimony whereof, I affix my signature.

GEORGE W. STEDWELL.